Sept. 26, 1961  H. R. BEEBE  3,001,323
SOUND PRODUCING DEVICES
Filed May 17, 1960

INVENTOR.
HERBERT R. BEEBE
BY Clark Ott
ATTORNEYS 3,001,323
SOUND PRODUCING DEVICES
Herbert R. Beebe, Richmond Hill, N.Y., assignor to American Doll & Toy Corp., Brooklyn, N.Y., a corporation of New York
Filed May 17, 1960, Ser. No. 29,752
2 Claims. (Cl. 46—187)

This invention relates to sound producing devices.

An object of the invention is to provide a sound producing device for incorporation in dolls, toys and the like for producing articulatory syllabical sounds in imitation of the human voice.

Another object of the invention is to provide a sound producing device carried by a hollow member mounted for longitudinal sliding movement in a housing for producing a sound by the flow of air through said sound producing device with the sliding movement of said member and with means carried by said housing for interrupting the flow of air from said member to thereby interrupt the sound so as to form syllabical sounds in imitation of spoken words.

Another object of the invention is to provide a sound producing device in which the sound is produced by a vibratory reed protruding from one end of a hollow member and a sound emitting opening is provided in the opposite end thereof adapted to be momentarily closed by a thin flexible element carried by the housing with the movement of the hollow member for interrupting the sound produced by the reed.

A further object of the invention is to provide a sound producing device of said character in which the hollow member is unconnected with the housing and has frictional engagement with the inside face thereof only for guided sliding movement longitudinally thereof for displacing the air from one side of said hollow member through said reed.

Still another object of the invention is to provide a sound producing device which consists of novel features of construction and arrangement of parts by which an improved sound producing mechanism is obtained.

With the foregoing and other objects in view, reference is now made to the following specification and accompanying drawings in which the preferred embodiment of the invention is illustrated.

Figure 1:
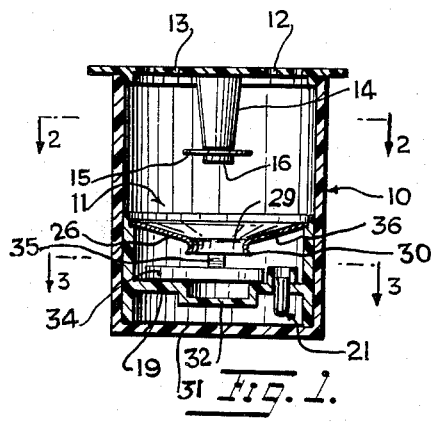
FIG. 1 is a vertical sectional view of a sound producing device constructed in accordance with the invention.
Figure 2:
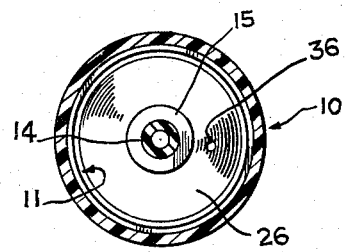
FIG. 2 is a transverse sectional view taken approximately on line 2—2 of FIG. 1.
Figure 3:
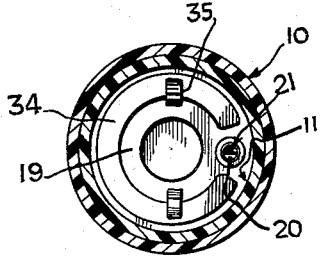
FIG. 3 is a similar view taken approximately on line 3—3 of FIG. 1.

Referring to the drawings, the sound producing device includes a housing 10 having a hollow slide member 11 frictionally fitting the inside face thereof for longitudinal sliding movement. The housing 10 is of cylindrical formation and is provided with an open end which is closed by a cover 12 releasably secured thereon in any desired manner. The cover 12 has one or more apertures 13 for the emission of sound from within the housing. Carried by and extending inwardly from the cover is a stem 14 having a relatively thin flexible resilient disc 15 removably secured on the inner end thereof by a headed plug 16 which extends through the disc and is anchored in the stem.

The slide member 11 is of cylindrical formation in cross-section and has a transversely extending wall 19 spaced from the ends thereof. The partition wall 19 is formed with an opening 20 having a sound producing member 21 protruding therethrough which in the present embodiment consists of a vibratory reed 22 carried by a hollow tube 23 with an air passageway 24 leading from the throat 25 covered by the reed and which opens into the interior of the slide member.

The outer end of the slide member 11 is closed by a conical shaped plate 26 which frictionally fits a peripheral recess 27 and seats on the shoulder 28 at the bottom of the recess for removably retaining the plate in fixed position therein. The plate 26 is provided with a central opening 29 which is of a diameter somewhat less than the diameter of the disc 15 and is formed by the rolled inwardly directed peripheral flange 30. The disc 15 being relatively thin and of flexible resilient material such as rubber and the like has impinging engagement against the inside face of the flange 30 in passing through said opening to thereby close the opening with the movement of the hollow member 11.

Figure 5:
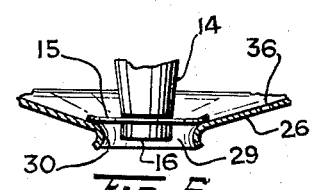
FIG. 5 is an enlarged fragmentary sectional view showing the flexible disc after passing through the sound emission opening in the slide member.

The opening 29 is an emission opening for sound produced by the sound producing member 21 with the sliding movement of the hollow member 11 toward the closed end 31 of the housing for displacing the air through the sound producing member 21 from between the partition wall 19 and the end wall 31 of the housing. When the slide member is positioned with the plate 26 disposed adjacent the cover 12, the head of the plug 16 will be disposed in the recess formed by the depressed central portion 32 of the partition wall 19. With the movement of the hollow member 11 toward the end wall 31, the displacement of the air through the sound producing member 21 will cause the reed 22 to vibrate and emit a sound which will pass through the opening 29 and thence through the opening 13 in the cover 12. The sound will continue until the disc engages the flange 30 to close the opening 29 and thereby momentarily interrupt the passage of air and the sound therethrough. After the disc 15 has passed through the opening 29 as shown in FIG. 5 of the drawings, air from within the slide member 11 will again flow through the opening 29 with the emission of the sound produced by the sound producing member 21. This momentarily closing of the opening 29 with the movement of the hollow member 11 functions to form articulated syllables in the sound in imitation of spoken words such as "ma-ma." The reed 22 can be tuned to produce the "ma" sound or other sounds such as "pa."

The slide member 11 is weighted by a metal weight 34 which is of arcuate formation and is adapted to seat on the partition wall 19. The weight 34 is provided with upwardly extending lugs 35 against which the plate 26 is impinged when in position on the shoulder 28. This holds the weight in position and prevents the same being displaced.

The plate 26 has a small aperture 36 which permits of the flow of a small amount of air from the slide member 11 during the interval that the opening 29 is closed by the disc 15. Thus, the closing of the opening 29 will not interrupt the gravitational sliding movement of the slide member 11 toward the end wall 31.

The sounding device is adapted to be arranged in a doll or toy with the cover 12 exposed at the back thereof. With the movement of the doll or toy to a reclining position or on its back, the slide member 11 gravitationally slides to the outer end of the housing 10 or adjacent the cover 12. The sound producing member will make no sound during this movement of the slide member. However, when the doll or toy is moved to upright relation, the slide member 11 will gravitationally slide to the inner end of the housing with the emission of syllabical sounds as hereinbefore described.

The housing and the slide member are preferably formed of thermoplastic material while the plate 26 and the weight 34 are preferably of metal.

The disc 15 which is relatively thin normally retains the disc formation but will flex and bend as the same passes through the opening 30 with the movement of the slide member 11.

Figure 6:
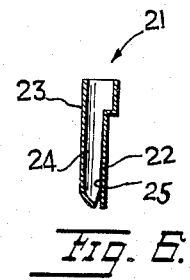
FIG. 6 is a vertical sectional view through the sound producing member.
Figure 4:
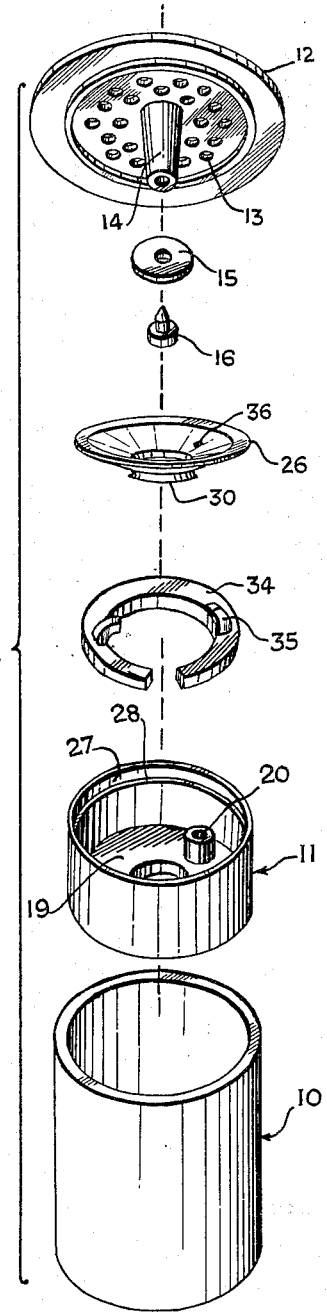
FIG. 4 is a perspective view of the parts of the sound producing device shown in separated juxtaposition.

The sound producing member 21 is described herein as having a vibratory reed 22 for producing a sound. As illustrated in FIG. 6 of the drawings, the vibratory member 22 may be in the form of a tongue which may be formed as a part of the hollow tube 23.

While the preferred form of the invention is shown and described herein, it is to be understood that the same is not so limited but shall cover and include any and all modifications thereof which fall within the purview of the invention.

What is claimed is:

1. In a sound producing device, a housing having a peripheral wall and end walls, one of said end walls being foraminated, a hollow slide member consisting of a peripheral wall and end walls closing the ends of said slide member, said peripheral wall of said slide member frictionally fitting throughout its length the inside face of the peripheral wall of said housing for sliding movement of said slide member in opposite directions towards said end walls of the housing respectively, one of the said end walls of said slide member having a central opening with a rolled flange of arcuate shaped formation in cross-section extending peripherally about said opening, a sound producing means of hollow formation carried by the other wall of said slide member with one end of said sound producing means opening into said slide member and the opposite end of the sound producing means opening into said housing for the flow of air therethrough, said foraminated wall of the housing having a centrally disposed inwardly extending stem, a thin flexible resilient member affixed to the inner end of said stem, said resilient member being slightly larger in size than the area of said central opening and which is adapted to frictionally engage said rolled flange to close said central opening during the movement of said slide member away from the foraminated end wall of the housing for interrupting the emission of sound through said central opening produced by said sound producing means with the flow of air through said sound producing means and into said hollow slide member with the movement of said sound producing means away from said foraminated wall of said housing, a weight disposed between the end walls of said slide member for gravitationally moving said slide member toward and away from said foraminated end wall, and one of said end walls of said slide member having a bleed opening for the flow of air from said slide member during the time that said central opening is closed by said flexible member.

2. In a sound producing device, a housing having a peripheral wall and end walls, one of said end walls being foraminated, a hollow slide member consisting of a peripheral wall and fixed and removable end walls closing the ends of said slide member, said peripheral wall of said slide member frictionally fitting throughout its length the inside face of the peripheral wall of said housing for sliding movement of said slide member in opposite directions towards said end walls of the housing respectively, said removable end wall of said slide member being of metal and frictionally fitting within the peripheral wall of said slide member and extending inwardly and downwardly in concave formation from the periphery thereof to a central opening with a rolled flange of arcuate shaped formation in cross-section extending peripherally about said opening, a sound producing means of hollow formation carried by the other wall of said slide member with one end of said sound producing means opening into said slide member and the opposite end of the sound producing means opening into said housing for the flow of air therethrough, said foraminated wall of the housing having a centrally disposed inwardly extending stem, a thin flexible resilient member affixed to the inner end of said stem, said resilient member being slightly larger in size than the area of said central opening and which is adapted to frictionally engage said rolled flange to close said central opening during the movement of said slide member away from the foraminated end wall of the housing for interrupting the emission of sound through said central opening produced by said sound producing means with the flow of air through said sound producing means and into said hollow slide member with the movement of said sound producing means away from said foraminated wall of said housing, a weight secured in fixed position between the end walls of said slide member for gravitationally moving said slide member toward and away from said foraminated end wall, and said removable wall of said slide member having a bleed opening for the flow of air from said slide member during the time that said central opening is closed by said flexible member.

References Cited in the file of this patent
FOREIGN PATENTS
694,989 Great Britain _____ July 29, 1953